US006012539A

United States Patent [19]
Patmont

[11] Patent Number: 6,012,539
[45] Date of Patent: *Jan. 11, 2000

[54] ALL TERRAIN SCOOTER

[75] Inventor: Steven J. Patmont, Pleasanton, Calif.

[73] Assignee: Patmont Motor Werks, Livermore, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/071,473

[22] Filed: May 1, 1998

[51] Int. Cl.$^7$ ..................................................... B62D 61/02
[52] U.S. Cl. ....................... 180/223; 180/208; 280/87.041
[58] Field of Search .................................. 180/208, 219; 280/87.041, 87.05

[56] References Cited

U.S. PATENT DOCUMENTS

| D. 364,845 | 12/1995 | Witthaus | D12/218 |
|---|---|---|---|
| 1,707,831 | 4/1929 | Wayerski | 280/87.041 |
| 2,546,711 | 3/1951 | Amendt | 280/84.041 |
| 4,170,369 | 10/1979 | Strutman | 280/261 |
| 4,526,249 | 7/1985 | Parker | 180/219 |
| 4,727,951 | 3/1988 | Morioka et al. | 180/219 |
| 4,821,832 | 4/1989 | Patmont | 180/208 |
| 5,054,572 | 10/1991 | Parker | 180/219 |
| 5,067,580 | 11/1991 | Parker | 180/219 |
| 5,107,950 | 4/1992 | Horiike et al. | 180/219 |
| 5,361,864 | 11/1994 | Tanaka | 180/219 |
| 5,388,659 | 2/1995 | Pepe | 180/219 |
| 5,413,368 | 5/1995 | Pong et al. | 280/277 |
| 5,491,390 | 2/1996 | McGreen | 318/5 |
| 5,494,128 | 2/1996 | Witthaus | 180/221 |
| 5,660,242 | 8/1997 | Witthaus | 180/19.1 |
| 5,775,452 | 7/1998 | Patmont | 180/181 |

Primary Examiner—Lanna Mai
Assistant Examiner—Andrew J. Fischer
Attorney, Agent, or Firm—Rosenfeld & Associates

[57] ABSTRACT

An "all terrain" scooter is provided with a large central tubular chassis having two central brackets supporting a platform. At the front, the tubular chassis bends upward through a notch in the platform upwardly above the front wheel to support a steering head tube. The steering head tube supports a cantilevered steering wheel support. This cantilevered wheel support includes a shaft mounting stub and includes mounted disc brake calipers. A removable axle shaft keys to the cantilevered steering wheel support at one end, supports the wheel medially of its cantilevered end, and fastens through the wheel bearings on a wheel bearing retention bolt to firmly hold the steered wheel in place. Facilitated wheel mounting is disclosed by placing steering wheel into position with the attached brake disc in the brake calipers, inserting the axle member through the axle support stub shaft and fastening the steered front wheel in place with the wheel shaft retention bolt. At the rear, the tubular frame is offset to one side of the chassis for cantilevered support of the rear driven wheel. From this portion of the frame, pivotal mounting of an engine having a protruding shaft with a tire driving surface occurs. A stub mounts a rear wheel support axle which can be removeably mounted by a single bolt. There results scooter which when shipped can support the enlarged wheels on the scooter platform minimizing article size.

2 Claims, 6 Drawing Sheets

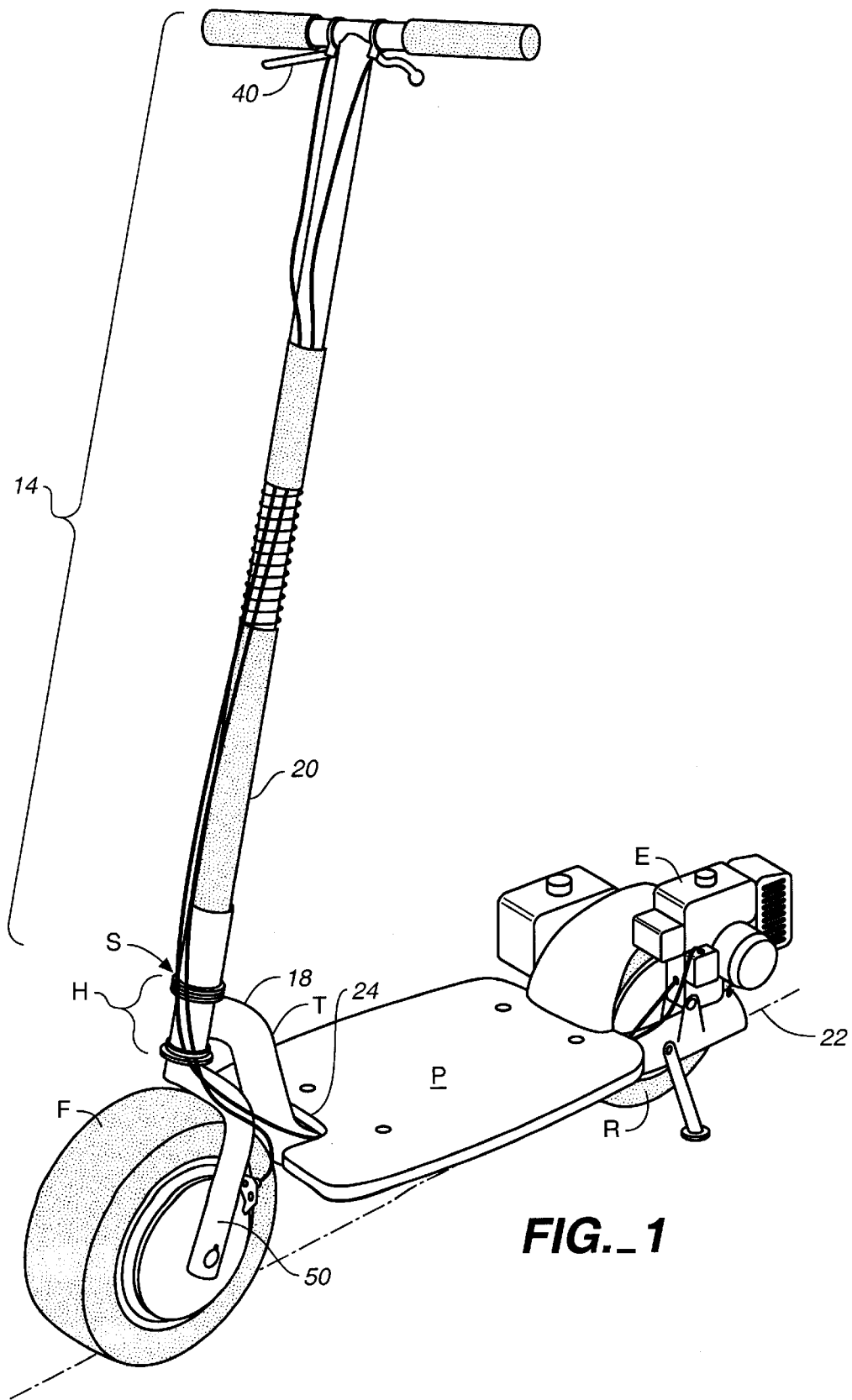
FIG._1

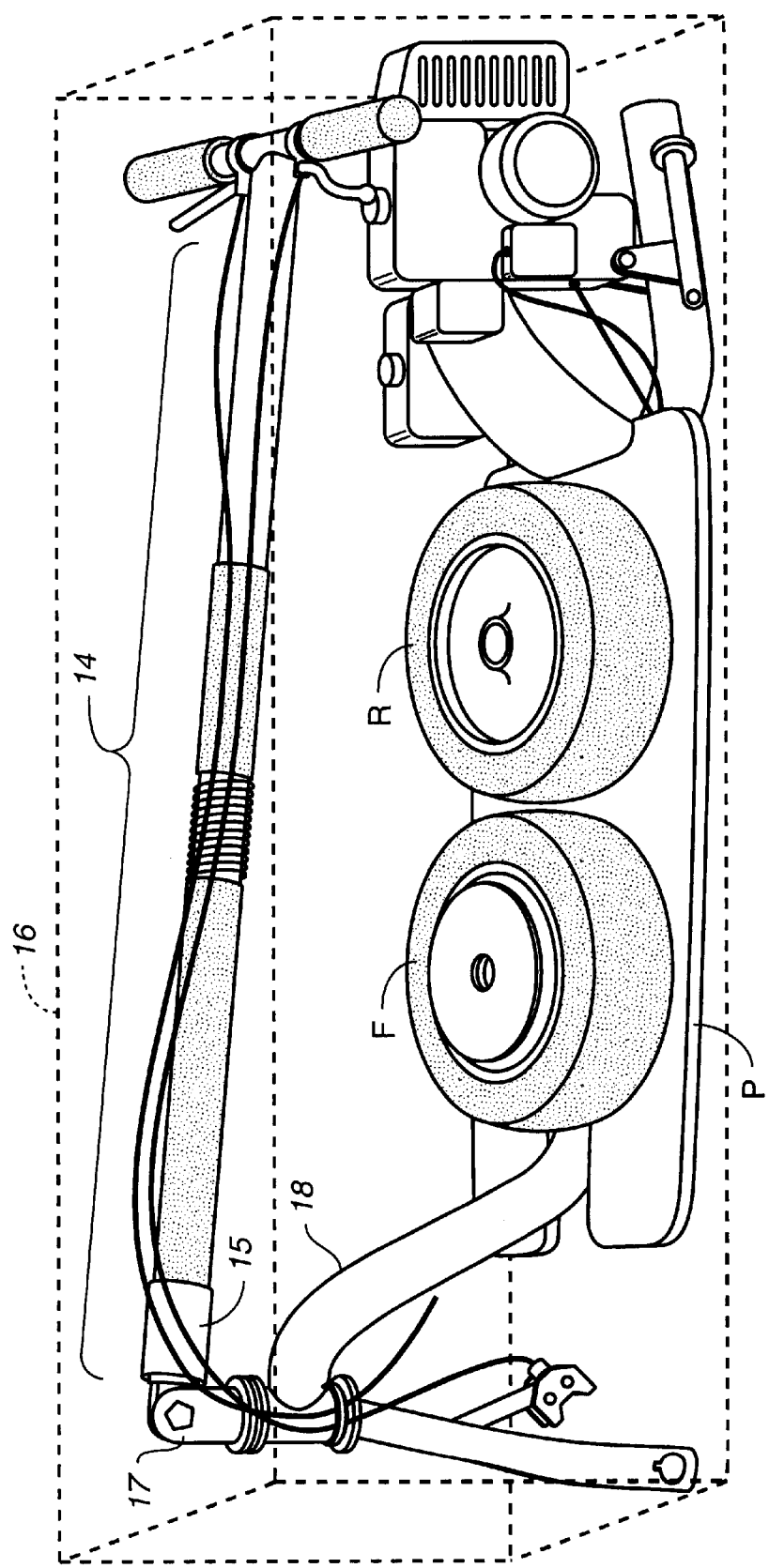
FIG._2

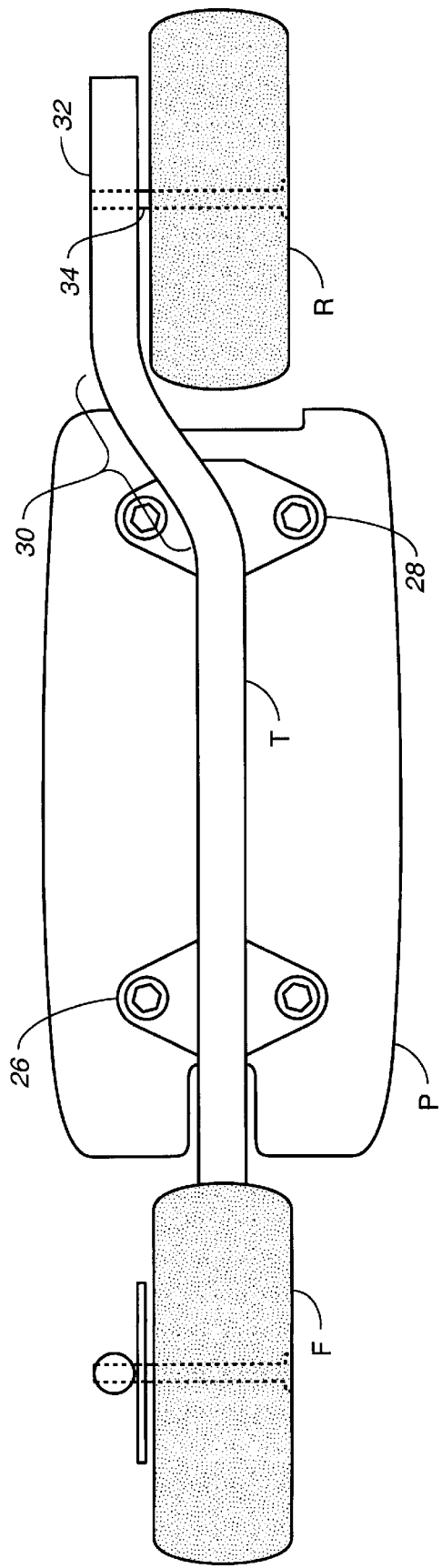
FIG._3

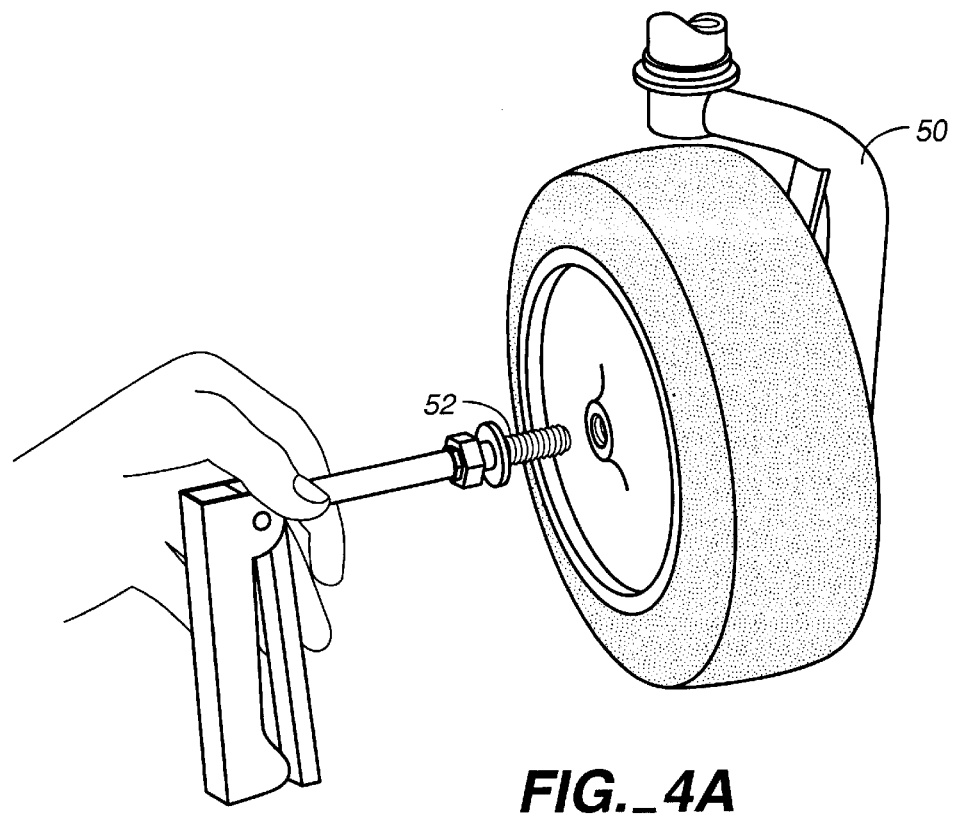
FIG._4A
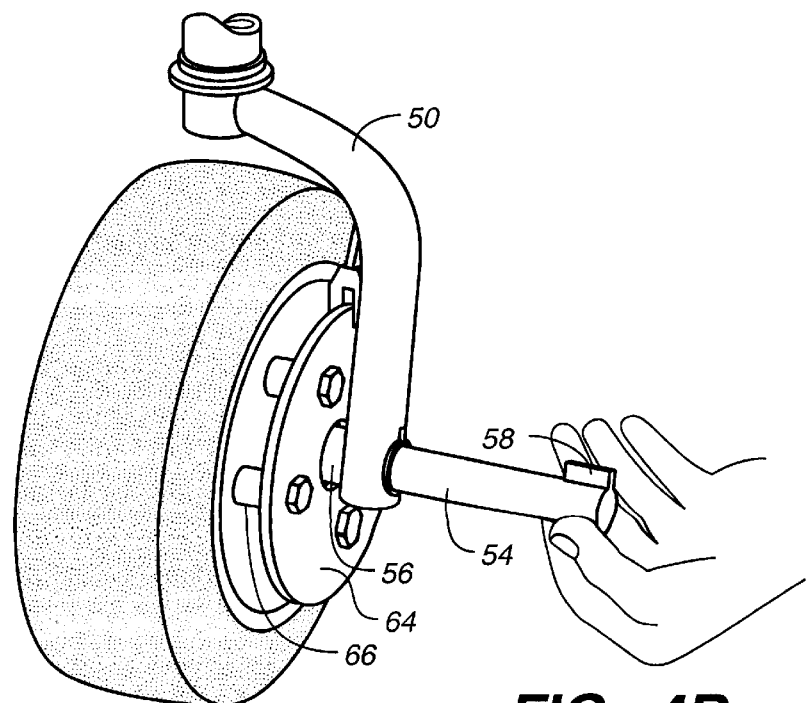
FIG._4B

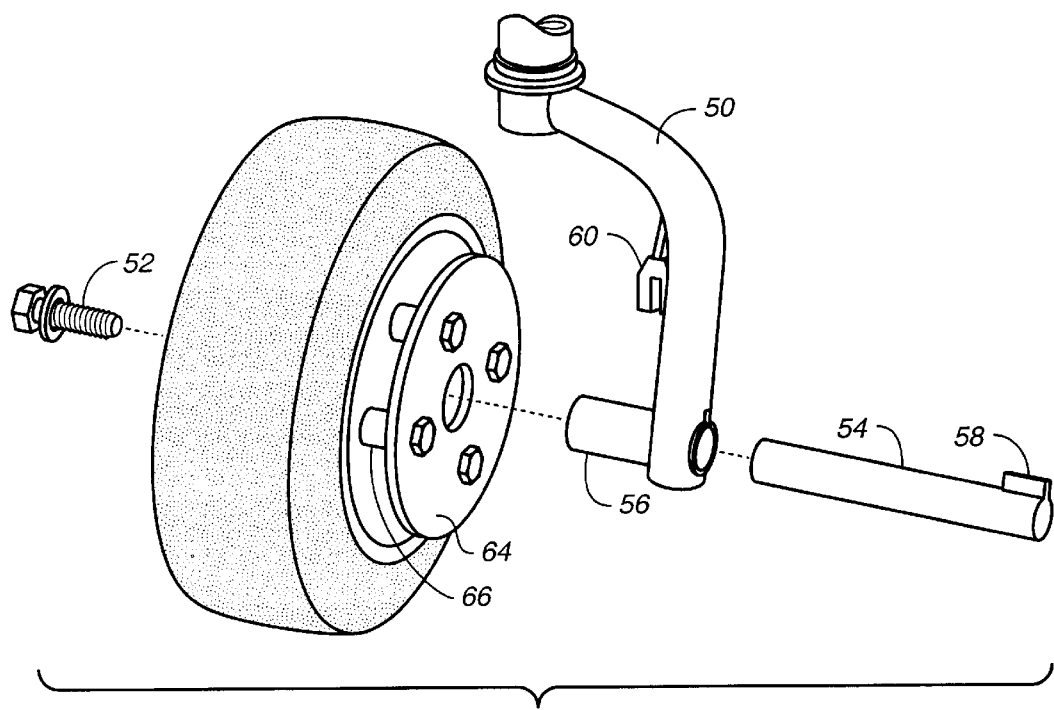
FIG._4C

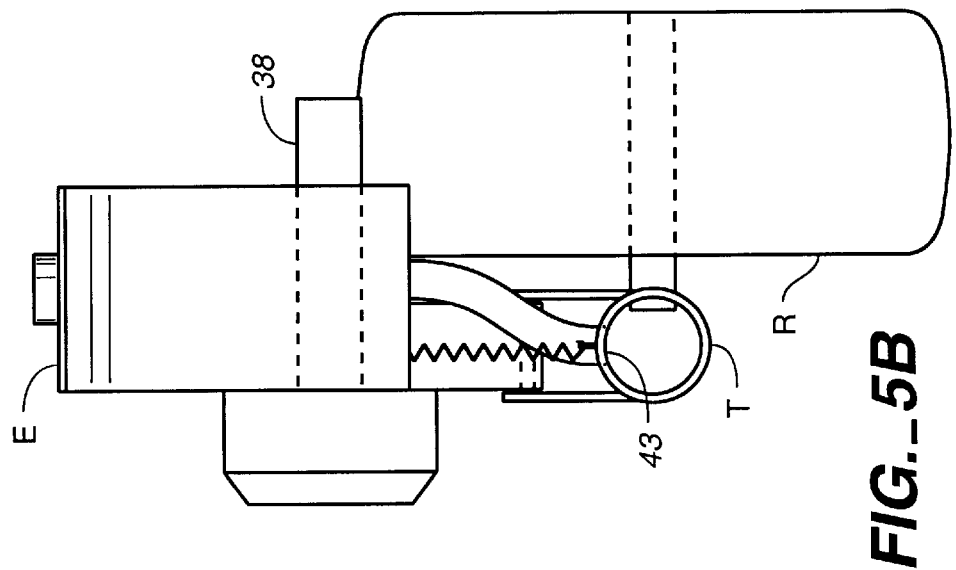
FIG._5B
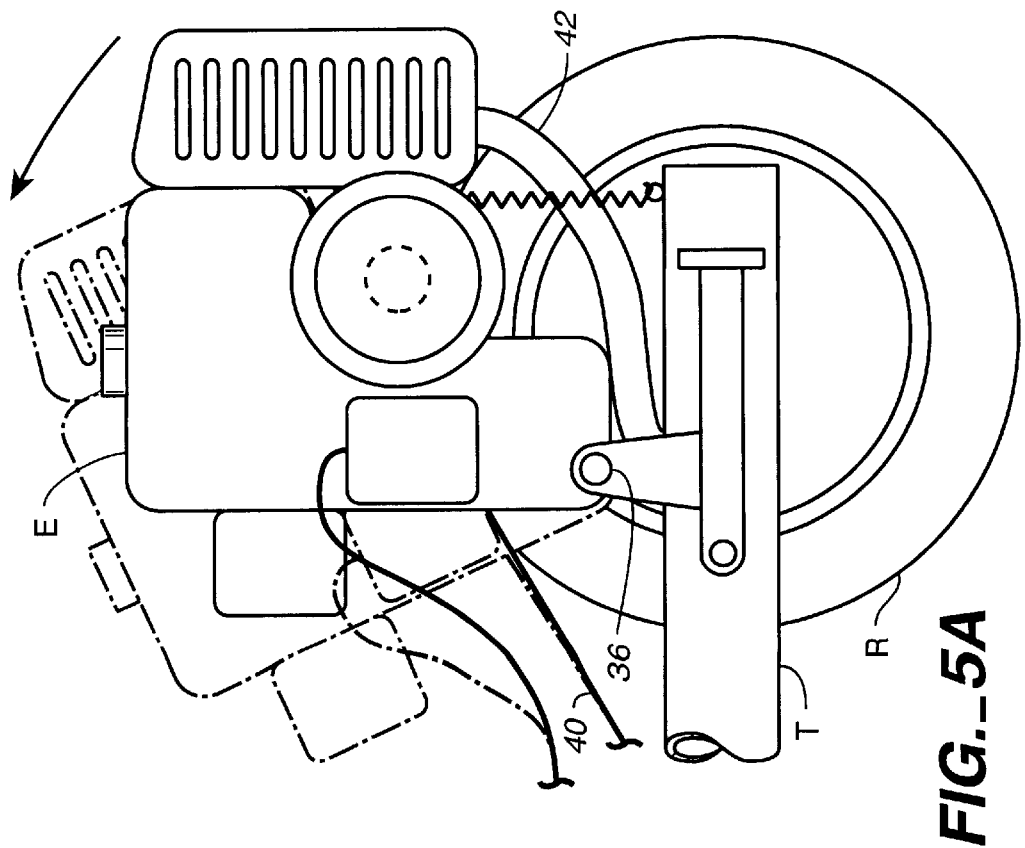
FIG._5A

ALL TERRAIN SCOOTER

This invention relates to motor powered scooters. More particularly, a construction of all terrain scooter is disclosed in which a frame supporting a platform for a standing rider is supported on a large central tubular member. The large tubular member effectively cantilevers the two wheels of the scooter. This cantilevered wheel construction enables reduced fabrication cost, reduced weight, maximizes simplicity of construction, allows customer mounting of wheels detached for shipment, and realizes a compact delivery package for the product.

BACKGROUND OF THE INVENTION

Motorized scooters are known. Such scooters can be purchased under the registered trademark Go-Ped from Patmont Motor Werks of Pleasanton, Calif. An example of such a scooter can be found in the patent literature in Patmont U.S. Pat. No. 4,821,832 issued Apr. 18, 1989 entitled Motor Scooter Having A fordable Handle and Friction Drive.

Referring to FIG. 1 of that patent, a scooter is disclosed with fork mounted front and rear wheels; the front wheel steers and the rear wheel is motor driven either through the axle or alternatively by a shaft in contact with the tire.

The reader can see and understand that the scooter in Patmont U.S. Pat. No. '832 is a small tired vehicle; because of the small tire size it is only suitable for operation of smooth flat surfaces such as sidewalks and roads.

There has arisen a need for larger tired scooter vehicles. Such vehicles can be utilized on an "all terrain" basis; they can easily transport "off-road" much in the manner that modern four wheel drive travel "off-road."

Unfortunately, as the vehicle becomes larger, the container in which the vehicle is shipped becomes larger. And where the container is larger, the difficulty of shipment increases.

SUMMARY OF THE INVENTION

An "all terrain" scooter is provided with a large central tubular chassis having two central brackets supporting a platform. At the front, the tubular chassis bends upward through a notch in the platform upwardly above the front wheel to support a steering head tube. The steering head tube supports a cantilevered steering wheel support. This cantilevered wheel support includes a shaft mounting stub and includes mounted disc brake calipers. A removable axle shaft keys to the cantilevered steering wheel support at one end, supports the wheel medially of its cantilevered end, and fastens through the wheel bearings on a wheel bearing retention bolt to firmly hold the steered wheel in place. Facilitated wheel mounting is disclosed by placing steering wheel into position with the attached brake disc in the brake calipers, inserting the axle member through the axle support stub shaft and fastening the steered front wheel in place with the wheel shaft retention bolt. At the rear, the tubular frame is offset to one side of the chassis for cantilevered support of the rear driven wheel. From this portion of the frame, pivotal mounting of an engine having a protruding shaft with a tire driving surface occurs. A stub shaft on the mounts a rear wheel support axle which can be removeably mounted by a single bolt. There results a scooter which when shipped can support the enlarged wheels on the scooter platform minimizing article size.

BRIEF DESCRIPTION OF THE DRAWINGS

FIG. 1 is a perspective view of the assembled kick stand supported scooter with steering handle extended and ready for operation;

FIG. 2 is a perspective view of the scooter with the wheels removed and mounted to the platform, the handle folded down, and the kick stand retracted illustrating in broken lines the elevational outline of a shipping container;

FIG. 3 is a bottom plan view of the scooter chassis illustrating the central tube with platform supporting brackets, the offset rear portion of the tube with its engine and rear wheel support, and the front portion of the tube extending through the platform notch;

FIG. 4A illustrates the initial bolt removal from the axle mounted through the cantilevered steering tube;

FIG. 4B illustrates the withdrawal of the cantilevered axle which then releases the steering wheel from the cantilevered steering tube;

FIG. 4C illustrates the cantilevered axle completely withdrawn with the wheel free not only of the cantilevered steering tube and the disc of the disc brake free of the brake caliper; and, FIG. 5 is a side elevation section of the rear portion of the vehicle illustrating the driving shaft in contact with the rear driven wheel and setting forth the rocked position of the engine away from the driven wheel for wheel removal.

DESCRIPTION OF THE PREFERRED EMBODIMENT

Referring to FIG. 1, scooter S is illustrated. Specifically, scooter S includes front steered wheel F, rear driven wheel R, with standing platform P therebetween. Engine E drives rear driven wheel R while steering handle 14 enables the rider standing on standing platform P to direct the path of scooter S.

Referring to FIG. 2, steering handle 14 is shown folded down over and parallel to standing platform P. This handle is of the type having a spring biased reciprocating sleeve 15 fitting over hinge 17. When spring biased reciprocating sleeve 15 over hinge 17, steering handle 14 is maintained vertical. When spring biased reciprocating sleeve 15 is moved away from hinge 17, steering handle 14 can be bent to the horizontal disposition shown in FIG. 2.

In the packing process disclosed, front steered wheel F and rear driven wheel R are shown removed from scooter S and stacked on standing platform P. In this disposition, it is seen that the removal of front steered wheel F and rear driven wheel R together with the folding of steering handle 14 lowers the vertical profile of scooter S. This enables shipping of the entire folded scooter S in a reduced height rectangular profile 16. In actual fact, and despite the enlarged front steered wheel F and rear driven wheel R, the entire scooter S fits into a 14 inch by 14 inch by 30 inch container with a total weight of 35 pounds. As will here in after be more fully detailed, the scooter chassis developed by main structural tube T and the cantilevered support of front steered wheel F and rear driven wheel R makes this reduced height rectangular profile 16 possible.

As is important to this invention, main structural tube T constitutes the primary member of the scooter chassis. Accordingly, its particular construction will be detailed.

At forward end 18, main structural tube T fastens to head tube H. As is traditional in such head tubes, this tube is substantially vertical having only a slight cant to and toward the rear of the scooter in the amount of about 10°. Such canting is in a common plane defined by steering column axis 20 and longitudinal axis 22.

As will be understood, steering column axis 20 is parallel to steering handle 14. Longitudinal axis 22 is taken longitudinally of the scooter chassis and is normal to the turning axis of front steered wheel F when the front wheel steers in the forward direction. Similarly, longitudinal axis 22 passes through the spin axis of rear driven wheel R and passes through the center of the rear driven wheel.

Main structural tube T extends through standing platform P at platform notch 24. Thereafter, as seen in FIG. 3, main structural tube T extends along the bottom of standing platform P. To facilitate fastening of standing platform P, forward platform bracket 26 and rear platform bracket 28 securely mount standing platform P to main structural tube T. From the vicinity of rear platform bracket 28, main structural tube T bends to the side of rear driven wheel R at side displacing section 30. Main structural tube T then straightens out at rear tire mounting section 32. As in the case of front steered wheel F, rear driven wheel R is mounted to cantilevered rear wheel supporting shaft 34.

The patent application filed by the present inventor on Apr. 9, 1998 and entitled Engine Drive for Scooter, Application No. 09/058,407, is incorporated herein by reference as if fully set forth herein.

It will suffice for purposes of this description to say that engine E is supported on pivot arm 36 and has protruding direct tire drive shaft 38. Simply stated, by raising and lowering engine E on pivot arm 36, direct tire drive shaft 38 comes into and out of contact with rear driven wheel R. This enables driving of rear driven wheel R. Raising and lowering of engine E on pivot arm 36 is effected by cable movement actuated by derailleur gear wire actuator 40 mounted on steering handle 14. Naturally, when engine E is raised, driving of rear driven wheel R stops; when engine E is lowered, driving of rear driven wheel R occurs.

I have disclosed in a previous patent the use of the main structural tube T as a muffler. Accordingly, it can be seen at FIG. 5 that flexible conduit 42 channels exhaust gas to main structural tube T at exhaust inlet 43 fashioned in the tube.

What remains to be set forth is the manner in which front steered wheel F is mounted to steering handle 14.

Observing steering handle 14, it will be seen that below head tube H, there is mounted cantilevered front wheel support 50. In the sequence of FIGS. 4A, 4B and 4C, the removal of the wheel from the mounted position is shown. It will be understood that the mounting of front steered wheel F will be the opposite of the shown removal.

Referring to FIG. 4A, wheel retention bolt 52 is shown being removed from a threaded bore (not shown) in the interior of front wheel support shaft 54. Front wheel support shaft 54 is in turn held at the bottom of cantilevered front wheel support 50 in shaft support stub 56. The outer most end of front wheel support shaft 54 is supplied with mounting tang 58 which fits into the side of cantilevered front wheel support 50. Mounting tang 58 resists turning of wheel support shaft 54 when wheel retention bolt 52 is tightened. Accordingly, when wheel retention bolt 52 is fastened interior of a threaded bore in front wheel support shaft 54, both front wheel support shaft 54 and wheel retention bolt 52 hold the shaft and front steered wheel F firmly in place. Contrarily, when wheel retention bolt 52 is total unscrewed, wheel retention bolt 52 is removed from one wheel side and front wheel support shaft 54 is removed from the opposite wheel side.

It will be seen in FIG. 4B that cantilevered front wheel support 50 has mounted thereto brake caliper 60. Likewise, front steered wheel F has mounted thereto brake disc 64. This mounting occurs by have four mounting bolts 66 extending through front steered wheel F holding brake disc 64 offset from but parallel to the axis of front steered wheel F.

Turning to FIG. 4C, it can be seen that when wheel retention bolt 52 and front wheel support shaft 54 are completely removed, front steered wheel F at attached brake disc 64 can be readily slipped out of brake caliper 60.

It turns out that this is an extremely advantageous arrangement for mounting and demounting front steered wheel F. Further, the mounting arrangement is simple, easily pictorially displayed, and can be followed by customers having relatively low levels of mechanical aptitude.

What is claimed is:

1. A motor powered scooter for supporting a standing rider comprising in combination:

a front steered wheel;

a rear driven wheel;

a platform that supports a standing rider on the scooter;

a main structural tube disposed substantially horizontally along a longitudinal axis supporting along the longitudinal axis the front steered wheel at a forward end of the main structural tube, the rear driven wheel at a rear end of the main structural tube, and the platform on the main structural tube there between;

at least one bracket on the main structural tube supporting the platform on the main structural tube in a horizontal disposition relative to the main structural tube;

a head tube formed about a substantially vertical axis to the longitudinal axis, the head tube fastened at the forward end of the main structural tube;

a cantilevered front wheel support rotatably mounted on the substantially vertical axis to the head tube supporting the steered front wheel on the longitudinal axis;

a cantilevered axle mounted to the cantilevered front wheel support that supports the front steered wheel;

the main structural tube at the rear end being bent to one side only away from a vertical plane, said vertical plane being defined by the longitudinal axis and the vertical axis, while the main structural tube remains in a horizontal plane, said horizontal plane being perpendicular to said vertical plane and containing said longitudinal axis;

a cantilevered axle mounted to the bent rear end of the main structural tube supporting the rear driven wheel; and a motor operatively connected to the rear driven wheel that drives the rear driven wheel.

2. The motor powered scooter recited in claim 1, wherein the head tube is canted approximately 10 degrees toward the rear end of the main structural tube.

* * * * *